United States Patent [19]

Murakami et al.

[11] 4,267,485

[45] * May 12, 1981

[54] FLUORESCENT LAMP WITH SHARP EMISSION PEAKS BETWEN 480 AND 490 NM AND BETWEEN 620 AND 640 NM

[75] Inventors: Katsuo Murakami; Yoshinori Anzai; Mitsuoki Otani; Hiroshi Ito, all of Kamakura, Japan

[73] Assignee: Mitsubishi Denki Kabushiki Kaisha, Tokyo, Japan

[*] Notice: The portion of the term of this patent subsequent to Nov. 13, 1996, has been disclaimed.

[21] Appl. No.: 954,473

[22] Filed: Oct. 25, 1978

[30] Foreign Application Priority Data

Jan. 30, 1978 [JP] Japan .................. 53/9042

[51] Int. Cl.$^3$ .......................... H01J 63/04; H01J 1/62
[52] U.S. Cl. .................................... 313/486; 313/487
[58] Field of Search .......................... 313/486

[56] References Cited

U.S. PATENT DOCUMENTS

| | | | |
|---|---|---|---|
| 2,143,077 | 1/1939 | Leverene | 313/486 |
| 2,223,426 | 12/1940 | McKeag et al. | 313/486 X |
| 2,607,014 | 8/1952 | Roy et al. | 313/486 |
| 3,416,019 | 12/1968 | Kaduk | 313/486 |
| 3,748,516 | 7/1973 | Blasse et al. | 313/486 |

OTHER PUBLICATIONS

Elenbaas, Philips Technical Library, Fluorescent Lamps; edited by W. Elenbaas; English ed. 1971; The Macmillan Press Ltd., London; p. 100 cited, lines 18-24.

*Primary Examiner*—Robert Segal
*Attorney, Agent, or Firm*—Oblon, Fisher, Spivak, McClelland & Maier

[57] ABSTRACT

A fluorescent lamp having excellent color rendering property and high luminous efficiency comprises a fluorescent layer coated on an inner surface of a discharge tube.

The fluorescent layer mainly comprises a first fluorescent material having-emission peak in a range of wavelength of 480 to 490 nm which is an alkaline earth metal boron phosphate activated by a divalent europium compound having the formula $$m(Sr_{1-x-y-p}Ba_xCa_yEu_pO) \cdot (1-n)P_2O_5 \cdot nB_2O_3$$

wherein the parameters x, y, p, m and n are in ranges of $0 \leq x \leq 0.5$
$0 \leq y \leq 0.2$
$0.001 \leq p \leq 0.15$
$1.75 \leq m \leq 2.30$ and
$0.05 \leq n \leq 0.23$ and a second fluorescent material having the emission peak in a range of wavelength of 620 to 649 nm and a band width (50%) of 120 to 160 nm.

8 Claims, 7 Drawing Figures

FLUORESCENT LAMP WITH SHARP EMISSION PEAKS BETWEEN 480 AND 490 NM AND BETWEEN 620 AND 640 NM

BACKGROUND OF THE INVENTION

The present invention relates to a low pressure mercury discharge lamp which is a fluorescent lamp having excellent color rendering property to impart a color of a lightened object similar to that lightened by natural light.

In the specification, the fluorescent material means "phosphor" and the boron phosphate means "boratephosphate" and the bright line spectrum means "line spectrum" and the luminous layer means "fluorescent layer".

The color rendering property of a fluorescent lamp is evaluated depending upon shape of a spectral distribution.

Accordingly, as one manner for improving a color rendering property of a fluorescent lamp, it has been proposed to combine various fluorescent materials having different emission spectra whereby the spectral distribution is varied to obtain a desired color rendering property.

However, radiation from a fluorescent lamp usually comprises a continuous spectrum part emitted from the fluorescent layer and a bright line spectrum part emitted from a mercury vapor discharge.

The mercury bright line spectrum prevents an improvement of the color rendering property. The kinds of fluorescent materials which can be applied to a commercial fluorescent lamp are limited in practice whereby the spectral distributions which can be given are limited. Accordingly, improvement of the color rendering property is limited.

In order to improve the color rendering property, it has been proposed to control blue mercury bright line spectrum at 405 nm and 436 nm which cause deterioration of the color rendering property. It has been proposed to provide a two layer coating system wherein a first layer for absorbing blue light is formed on an inner surface of a discharge tube by coating a red emitting fluorescent material for absorbing blue light to convert the energy to red light, and a second layer of a fluorescent material for emitting in blue, green, yellow and orange wavelength region is coated on the first layer. In this method, magnesium lithium arsenate activated by a tetravalent manganese compound or magnesium fluorogermanate are used as the fluorescent material in the first layer. These fluorescent materials form a blue light absorbing layer and additionally supply red light.

As the results of these studies, fluorescent lamps having good color rendering property have been obtained. However, these fluorescent lamps in the two layer coating system have serious disadvantages as follows. The red fluorescent material activated by tetravalent manganese has low luminous efficiency. The visible light emitted from the second layer is partially absorbed by the first layer and only a small amount of the absorbed energy is emitted again on the visible wavelength region, whereby the luminous efficiency of the fluorescent lamp is seriously decreased disadvantageously.

It has been also proposed to substitute the fluorescent material in the first fluorescent layer with a yellow pigment such as Titan yellow which absorbs blue light. However, in this method, the visible light emitted from the second fluorescent layer is also absorbed whereby the luminous efficiency is decreased.

These two layer coating systems have further serious disadvantages. Since it has required two coating steps, the processing time is increased and the control of light color and color rendering property is relatively difficult.

SUMMARY OF THE INVENTION

It is an object of the present invention to overcome the abovementioned disadvantages and to provide a fluorescent lamp having excellent color rendering property.

It is another object of the present invention to provide a fluorescent lamp whose excellent color rendering property is similar or superior to that of a lamp having a blue light absorbing layer coated in two coating steps, even though the fluorescent layer is formed by one coating step.

It is another object of the present invention to provide a fluorescent lamp having an improved luminous efficiency.

The foregoing and other objects of the present invention have been attained by providing a fluorescent lamp which comprises a luminous layer comprising mainly a bluish green emitting fluorescent material having the following formula and the emission peak in a range of wavelength of 480 to 490 nm and an orange emitting fluorescent material having the emission peak in a range of wavelength of 620 to 640 nm and a band width (50%) of 120 to 160 nm, (width of emission spectrum measured by a luminous intensity of 50% to the maximum luminous intensity) on an inner surface of a discharge tube.

The bluish green emitting fluorescent material is an alkaline earth metal boron phosphate activated by a divalent europium compound having the formula

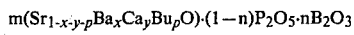

$$m(Sr_{1-x-y-p}Ba_xCa_yBu_pO)\cdot(1-n)P_2O_5\cdot nB_2O_3$$

wherein the parameters x, y, p, m and n are respectively in ranges of
 $0 \leq x \leq 0.5$,
 $0 \leq y \leq 0.2$,
 $0.001 \leq p \leq 0.15$
 $1.75 \leq m \leq 2.30$ and
 $0.05 \leq n \leq 0.23$ In the fluorescent lamp of the present invention the bluish green emitting fluorescent material and the orange emitting fluorescent material can be combined with one or more of the following fluorescent materials (a) to (d) to form the luminous layer coated on an inner surface of the discharge tube.

(a) blue emitting fluorescent material having the emission peak in a range of wavelength of 470 to 500 nm and a band width (50%) of 140 to 150 nm;

(b) green emitting fluorescent material having the emission peak in a range of wavelength of 520 to 540 nm and a band width (50%) of 40 to 50 nm;

(c) a red emitting fluorescent material having the emission peak in a range of wavelength of 655 to 660 nm which mainly emits in a range of wavelength of 600 to 700 nm; and (d) a fluorescent material having two emission peaks in ranges of 470 to 500 nm and 570 to 590 nm which mainly emits in a range of visible wavelength of 400 to 700 nm.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

The inventors have studied to attain the above-mentioned objects by repeating various preparations and tests. As a result, it has been found that these fluorescent lamps having said structure have excellent improved color rendering property and high luminous efficiency and have less decrease of luminous flux during operation without the conventional two layer coating system to form a blue light absorbing layer.

Referring to Figures and Tables, the present invention will be further illustrated.

The fluorescent materials of boron phosphate used in the present invention are novel bluish green emitting fluorescent materials having the emission peak in a range of 480 to 490 nm which have been invented by some of the inventors.

When the novel fluorescent material is used in the fluorescent lamp, the luminous efficiency is the same or about 50% higher than that of the conventional fluorescent material for the blue to bluish green wavelength region, namely calcium halophosphate activated by antimony, and the decrease of luminous flux during operation can be remarkably small.

The first advantage of the use of the boron phosphate fluorescent material is to obtain a fluorescent lamp having higher luminous efficiency and less decrease of luminous flux during operation in comparison with the conventional lamps. The advantages result since the boron phosphate fluorescent material has excellent luminous efficiency and less decrease of the luminous efficiency during operation.

The second advantage is to be able to control the energy of the blue mercury bright line spectrum which causes, inferior color rendering property without forming the blue light absorbing layer by the two layer coating system, whereby a fluorescent lamp having excellent color rendering property can be obtained. The advantage is obtained because the boron phosphate fluorescent material absorbs not only ultraviolet radiation but also blue visible radiation.

Figure 1:
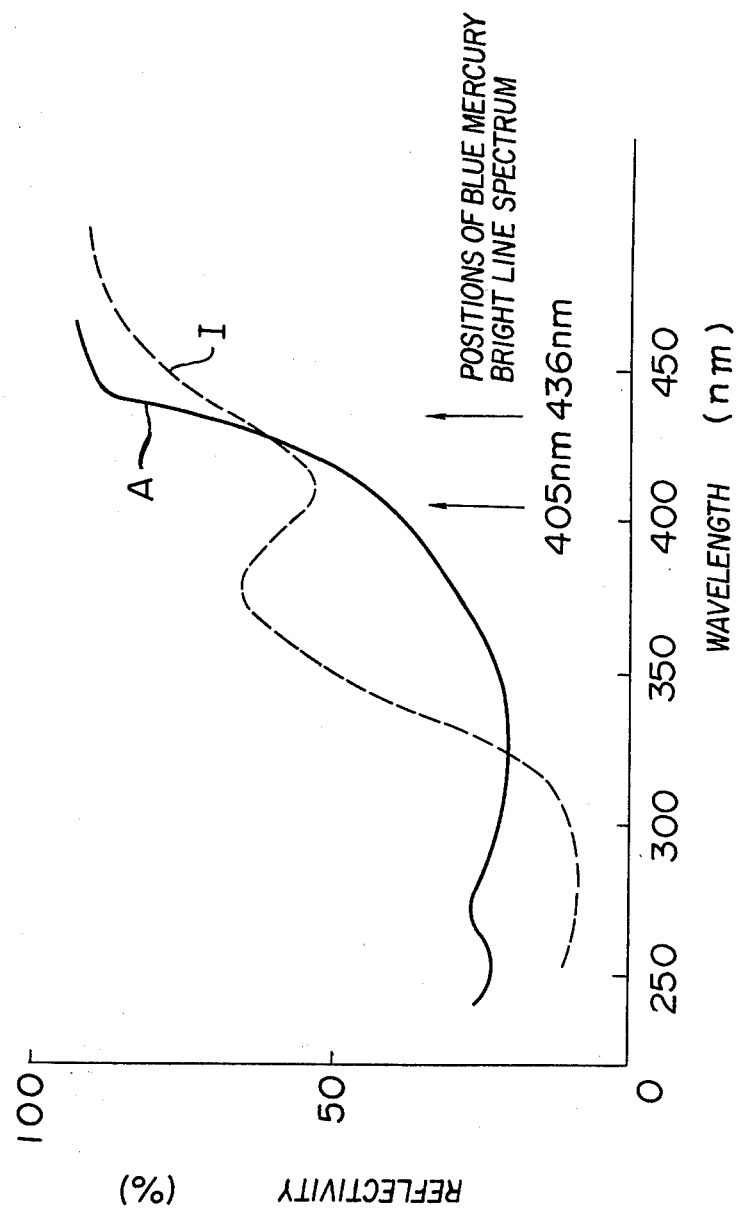
FIG. 1 shows reflection spectra of the fluorescent materials strontium boron phosphate activated by a divalent europium compound (curve A) and magnesium fluorogermanate activated with a tetravalent manganese compound (curve I).

FIG. 1 shows reflection spectra of the fluorescent material of strontium boron phosphate activated by a divalent europium compound (curve A) which is preferably used in the present invention and the fluorescent material of magnesium fluorogermanate activated with a tetravalent manganese compound (curve I) used for the blue light absorbing layer in the conventional two layer coating system.

The boron phosphate fluorescent material used in the present invention imparts low reflectivity in the wavelength for the visible mercury bright line spectrum (405 nm, 436 nm), similar to that of the magnesium fluorogermanate fluorescent material. That is, the boron phosphate fluorescent material has the function of absorbing blue mercury bright line spectrum as does the fluorogermanate fluorescent material. However, the boron phosphate fluorescent materials advantageously have remarkably higher luminous efficiency than the fluorogermanate fluorescent material, when it emits suitable visible radiation after absorbing the blue mercury bright line spectrum.

The third advantage is to provide a spectral distribution having less blue energy without a blue light absorbing layer since the boron phosphate fluorescent material does not substantially emit in a range of wavelength of 400 to 440 nm for the blue mercury bright line spectrum. Moreover, the blue mercury bright line spectrum absorbing effect is added and the fluorescent lamp having excellent color rendering property can be obtained.

Figure 2:
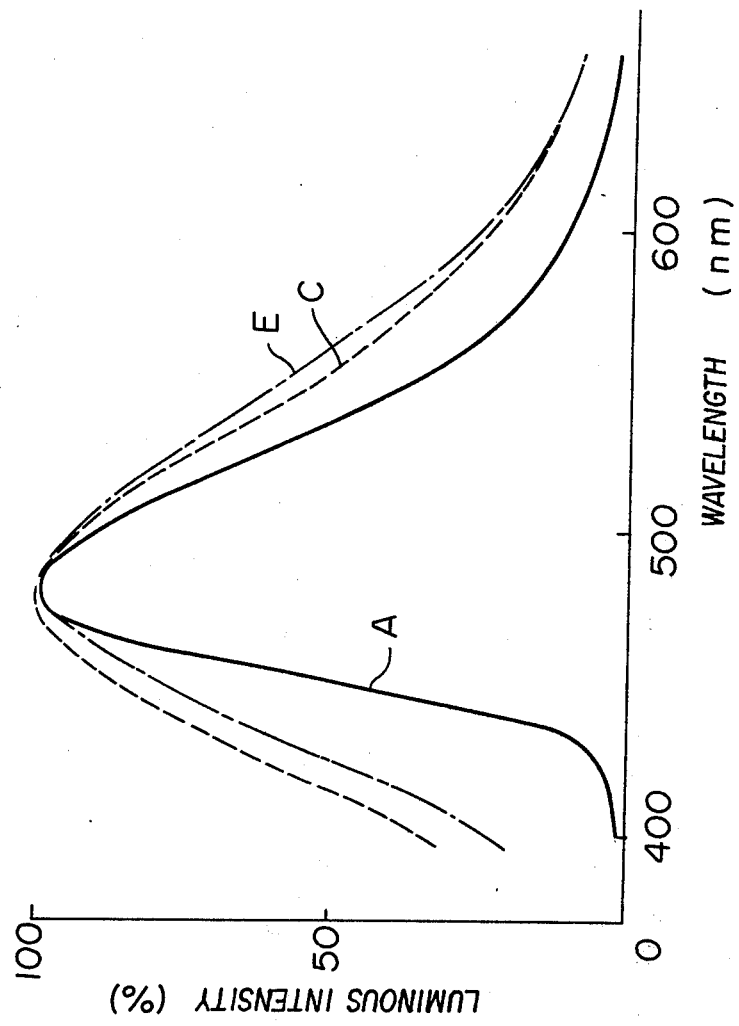
FIG. 2 shows emission spectra of the fluorescent materials strontium boron phosphate (curve A), calcium halophosphate activated by antimony (curve C) and magnesium tungstate (curve E).

FIG. 2 shows emission spectra of the strontium boron phosphate fluorescent material (curve A); the typical blue fluorescent material of calcium halophosphate activated by antimony (curve C) and magnesium tungstate (curve E), which are used in the conventional flourescent lamp.

As is clear from FIG. 2, the boron phosphate fluorescent material has no substantial emission in blue wavelength region.

The fourth advantage of the use of the boron phosphate fluorescent material is to prevent the energy loss such as an absorption of visible radiation in a blue light absorbing layer since the fluorescent lamp need not have the blue light absorbing layer.

The fluorescent lamp of the present invention does not have the disadvantages of the conventional fluorescent lamp with improved color rendering property by the two layer coating system, whereby it is further advantageous for imparting higher luminous efficiency.

It has been confirmed that the advantages achieved by the use of the boron phosphate fluorescent material are significantly decreased or completely lost when the other conventional bluish greenn emitting fluorescent materials are used.

For example, some of the conventional bluish green emitting fluorescent material of silicates activated by a divalent europium compound such as $(Ba, Sr)Si_2O_5$: Eu and $Ba_2MgSi_2O_7$: Eu have the function of absorbing blue mercury bright spectrum in small degree beside ultraviolet radiation, however the absorption effect is significantly lower than that of the boron phosphate fluorescent material or the luminous efficiency is significantly low.

Moreover, the decrease of luminous flux during operation, is significant whereby the light color of the fluorescent lamp using the silicate fluorescent material is significantly changed during operation and it is not practically used.

The conventional fluorescent material of alkaline earth metal aluminate activated by a divalent europium compound such as $BaAl_2O_4$: Eu also emits bluish green color and has the blue mercury bright line spectrum absorption effect, however it has significantly low luminous efficiency in comparison with that of the boron phosphate fluorescent material.

The conventional fluorescent material of alkaline earth metal phosphate activated by copper also emits bluish green color and does not substantially emit in the blue wavelength zone of the mercury bright line spectrum, however it has not the effect of absorbing the visible blue mercury bright line spectrum and the activator of copper component is oxidized in the baking step (lehring) to remarkably decrease the luminous output disadvantageously.

The alkaline earth metal boron phosphates having the above-mentioned formula are used as the bluish green emitting fluorescent material of the fluorescent lamp of the present invention.

The alkaline earth metal in the crystalline fluorescent material is strontium or a combination of strontium with a suitable amount of barium and/or calcium. When only strontium is used, the emission peak is in the wavelength of about 480 nm. When a content of barium is increased, the emission peak is gradually shifted to about 490 nm. The shift of the emission peak is advantageous to obtain excellent color rendering property in the preparation of a fluorescent lamp having relatively low color temperature, because it is not preferable to emit short wavelength visible light such as blue light in a fluorescent lamp having low color temperature.

When the calcium component is included in said range, the shift of the emission peak is quite small.

The band width (50%) of the flourescent material having said formula is varied depending upon the kind and content of the alkaline earth metal and it is in a range of about 80 to 120 nm. The variation can be controlled by the emission spectrum and ratio of the other fluorescent material added, to a desired range.

The contents of barium and calcium of the alkaline earth metal can be in the defined ranges ($0 \leq x \leq 0.5$ and $0 \leq y \leq 0.2$).

In general, from the viewpoints of the luminous efficiency, it is preferable to use only strontium or a combination of strontium and small amount of barium and/or calcium, since the luminous output is gradually decreased depending upon the increase of the content of barium and/or calcium. The barium content should be less than 0.5 as the parameter x and the calcium content should be less than 0.2 as the parameter y. When the content of barium and/or calcium is higher, the decrease of the luminous output is significant and it emits blue light having the emission peak in a range of blue wavelength zone of about 410 to 430 nm.

The europium content is selected from the range of the parameter of $0.001 \leq p \leq 0.15$, because the fluorescent material having high luminous output can be obtained.

The luminous output is significantly large in the case of $0.005 \leq p \leq 0.05$ and accordingly it is preferable to have the parameter p in said range.

The parameters m and n should be $1.75 \leq m \leq 2.30$ and $0.05 \leq n \leq 0.23$, since the luminous output is low out of said ranges. The maximum luminous output can be obtained in the case of $1.90 \leq m \leq 2.10$ and $0.14 \leq n \leq 0.18$.

Accordingly, it is especially preferable to have the parameters m and n in said ranges.

The boron phosphate fluorescent materials can be prepared as follows.

The raw materials of alkaline earth metal carbonate and its phosphate, boric acid and europium oxide etc. are blended at suitable ratios and the mixture is fired at about 1000° to 1200° C. in a reducing atmosphere of $N_2$ and $H_2$.

For example, the fluorescent material obtained from the mixture of raw materials of 1.68 moles of $SrHPO_4$, 0.28 mole of $SrCO_3$, 0.32 mole of $H_3BO_3$ and 0.02 mole of $Eu_2O_3$ has the formula

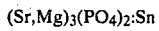

$$2(Sr_{0.98}Eu_{0.02}O) \cdot 0.84P_2O_5 \cdot 0.16B_2O_3$$

which is optimum and has the emission spectrum of curve A of FIG. 2.

In the boron phosphate fluorescent materials, it is possible to incorporate a small amount of Be, Mg, Zn, Cd, Mn, Sc, Y, La, Ce, Tb, Pb, Ga, Al, Si, Zr, Ge and S in the crystalline fluorescent material. However, when the content of these elements is higher than 5% of the total of alkaline earth metals, europium, phosphorus and boron, the disadvantages such as the decrease of luminous intensity are found.

As the other fluorescent materials to be used with the boron phosphate fluorescent material to form a suitable spectral distribution, it is preferable to use strontium-magnesium phosphate activated by tin having the formula $$(Sr,Mg)_3(PO_4)_2:Sn$$

from the viewpoints both of the color rendering property and the luminous efficiency.

It is possible to use a modified phosphor wherein a part of the strontium is substituted withh barium and/or calcium and a part or whole of the magnesium is substituted with zinc as known in the art.

The emission spectrum of the fluorescent material is slightly changed by these substitutions. As the results of tests, it has been found that the fluorescent material having the emission peak in a range of wavelength of 620 to 640 nm and a band width (50%) of 120 to 160 nm can be preferably used for the fluorescent lamp of the present invention, since high color rendering property and improved luminous efficiency can be obtained by using the fluorescent material.

Figure 3:
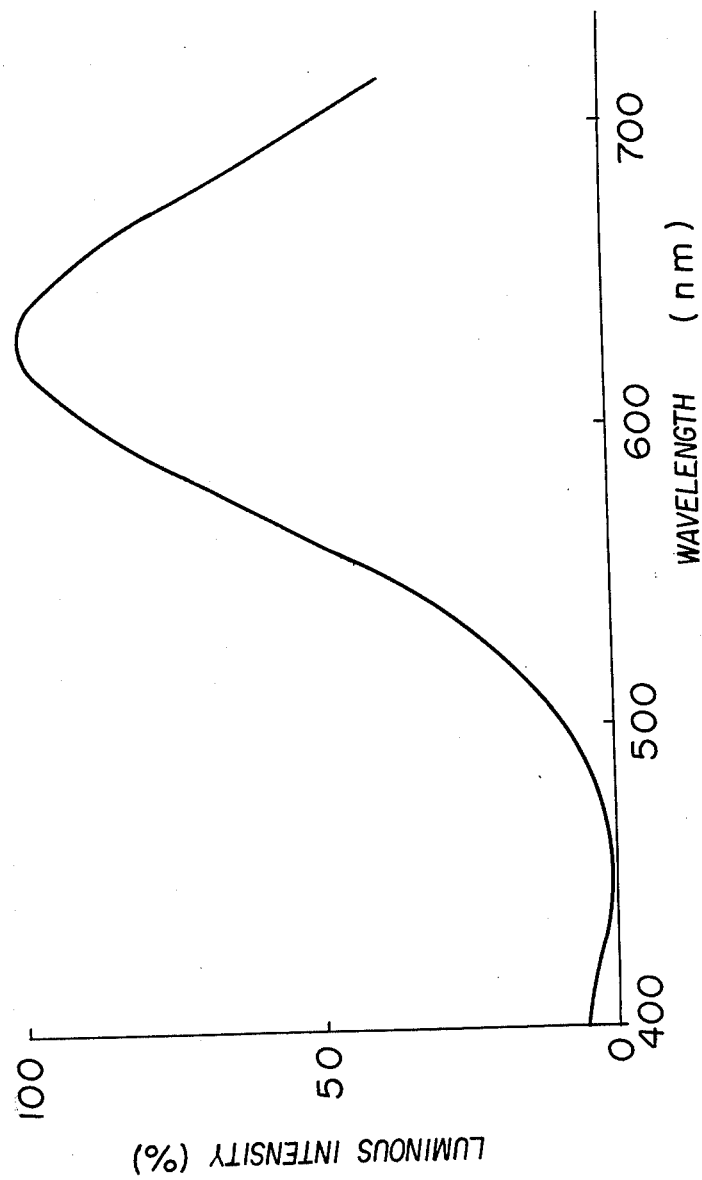
FIG. 3 shows the emission spectrum of the fluorescent material having the formula $(Sr, Mg)_3 (PO_4)_2$:Sn.

FIG. 3 shows the emission spectrum of the fluorescent material having the formula

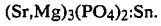

$$(Sr,Mg)_3(PO_4)_2:Sn.$$

The fluorescent lamp prepared by coating a combination of the fluorescent materials of the phosphate activated by tin and the boron phosphate activated by a divalent europium compound imparts excellent color rendering property and high general color rendering index (hereinafter referring to as Ra) (see Japanese Industrial Standard-Z 8726) without requiring the blue light absorbing layer in the two layer coating system.

That is, the fluorescent lamp prepared by using the combination of said two fluorescent materials has Ra=97 in the case of a lamp having a color temperature of 5000 K. Such high value Ra at that color temperature could be attained hitherto only by the conventional lamp having the two layer coating system. The fact should be considered. The value Ra of the conventional fluorescent lamps having no blue light absorbing layer has been about 92 to 93 as maximum.

The fluorescent lamp of the present invention (40W: straight tube type) has a luminous efficiency of 62 lm/W whichh is remarkably higher than that of the conventional fluorescent lamp having the two coated layers which is 52 lm/W and that of the conventional fluorescent lamp having Ra=92 and no blue light absorbing layer which is 55.0 lm/W.

Figure 4:
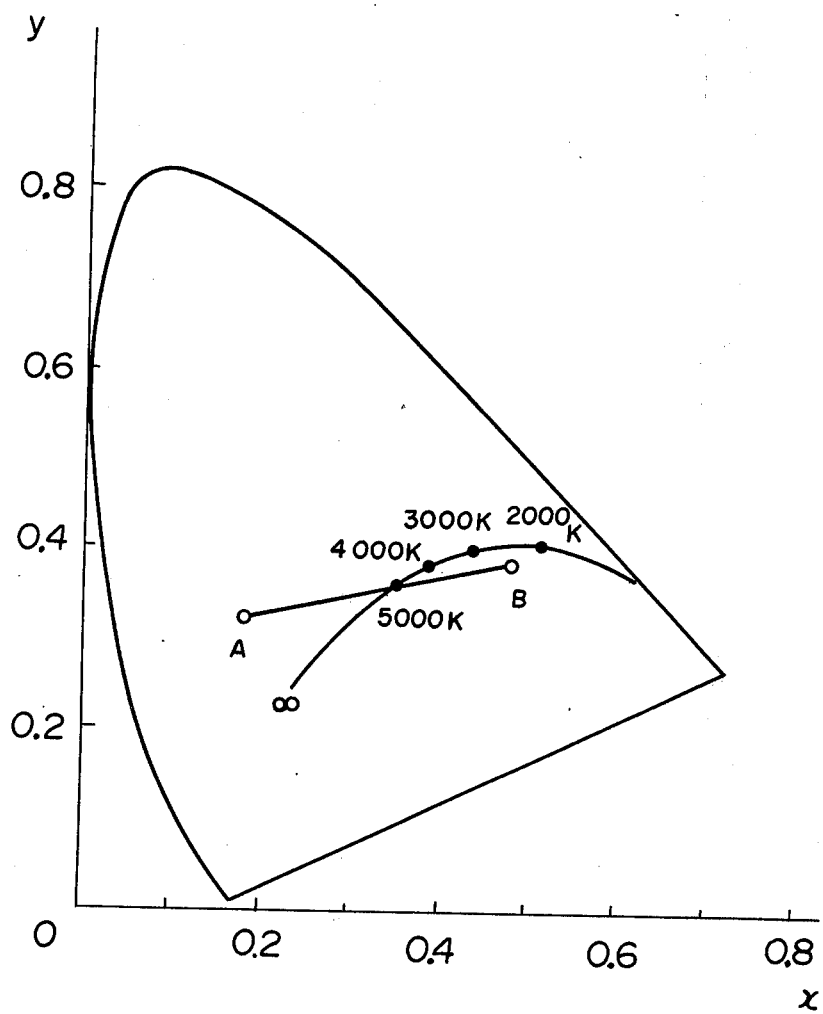
FIG. 4 shows the locus of chromaticity coordinates of a fluorescent lamp using the combination of two types of fluorescent materials according to the invention.

FIG. 4 line A—B shows the locus of chromaticity coordinates of the fluorescent lamp obtained by using the combination of the two kinds of the fluorescent materials wherein the coordinate A is the chromaticity coordinate for the boron phosphate fluorescent material and the coordinate B is that of the phosphate (activated by tin) fluorescent material.

It has been found that when a suitable amount of one or more of the following other fluorescent materials (a) to (d) is combined with the combination of the boron phosphate fluorescent material and the phosphate (activated by tin) fluorescent material, sometimes higher color rendering property and/or high luminous efficiency can be obtained depending upon the desired chromaticity coordinate of the lamp.

When said other fluorescent material is incorporated, the chromaticity coordinate other than the line A—B can be also obtained whereby the light color of the lamp can be selected as desired. It is preferable that the light color of the lamp appears natural to the eye. Accordingly, the chromaticity coordinate is preferably near a locus for a black body, and it is important to be able to select the light color.

That is, in the fluorescent lamp of the present invention, the fluorescent materials of the boron phosphate activated by a divalent europium compound and the phosphate activated by tin can be combined with the following fluorescent materials.

(a) Alkaline earth metal halophosphate activated by antimony and magnesium tungstate and mixtures thereof.

The emission spectrum of the halophosphate fluorescent material is slightly changed by the incorporation of one or more said fluorescent materials or the formula of the halophosphate whereby the blue emitting fluorescent materials having the emission peak in a range of wavelength of 470 to 500 nm and the band width (50%) of 140 to 150 nm are obtained.

(b) Zinc silicate activated manganese and zinc-magnesium silicate-germanate activated with manganese and mixtures thereof.

The emission spectrum of the silicate-germanate fluorescent material is slightly changed by the incorporation of one or more said fluorescent materials or the formula of the silicate-germanate fluorescent material whereby the green emitting fluorescent materials having the emission peak in a range of wavelength of 520 to 540 nm and the band width (50%) of 40 to 50 nm are obtained.

(c) Magnesium fluorogermanate activated with manganese, magnesium arsenate activated with manganese and mixtures thereof.

The red emitting fluorescent materials having the emission peak in a range of wavelength of 655 to 660 nm which mainly emit in a range of wavelength of 600 to 700 nm are obtained by one or more fluorescent materials.

(d) Alkaline earth metal halophosphate activated by antimony and manganese.

The fluorescent materials respectively having two emission peaks in ranges of wavelength of 470 to 500 nm and 570 to 590 nm which emit in a range of all visible wavelength region of 400 to 700 nm are obtained depending upon the formula.

In the present invention, the fact of the use of (a) the fluorescent material having wide band width (50%) which radiates energy in blue wavelength region of about 400 to 440 nm, seems to conflict with the desired effect of preventing the energy of blue light by the use of the boron phosphate fluorescent material. However, it is not contradictory, since sometimes, the energy of blue light is not enough in the case of the boron phosphate fluorescent material depending upon the desired chromaticity coordinate.

Such a phenomenon is not found in the case of the fluorescent lamp having low color temperature. However, relatively much energy of blue light is required in the case of the fluorescent lamp having high color temperature and that of pink light (the chromaticity coordinate is toward the lower side of the locus of black body).

It has been found that a suitable result is obtained by adding (a) the blue flourescent material to give suitable energy of blue light.

However, it has been found that the energy of blue light is too much to obtain satisfactory color rendering property in the conventional lamp using only (a) the conventional blue fluorescent material without using a novel boron phosphate fluorescent material, at the color temperature lower than about 7500 K.

Thus, in the fluorescent lamp having high color temperature or pink color, it has been considered to use a fluorescent material whose energy of blue light is slightly more than that of the boron phosphate fluorescent material and less than that of (a) the conventional blue emitting fluorescent material. However, such desired fluorescent material having satisfactory luminous efficiency has not been known.

The luminous characteristics of the fluorescent materials used in the present invention and the chromaticity coordinates of 40 W fluorescent lamps prepared by using the fluorescent materials are shown in Table 1.

The typical data are shown in Table 1 though these data are slightly varied depending upon the particular formula.

Figure 5:
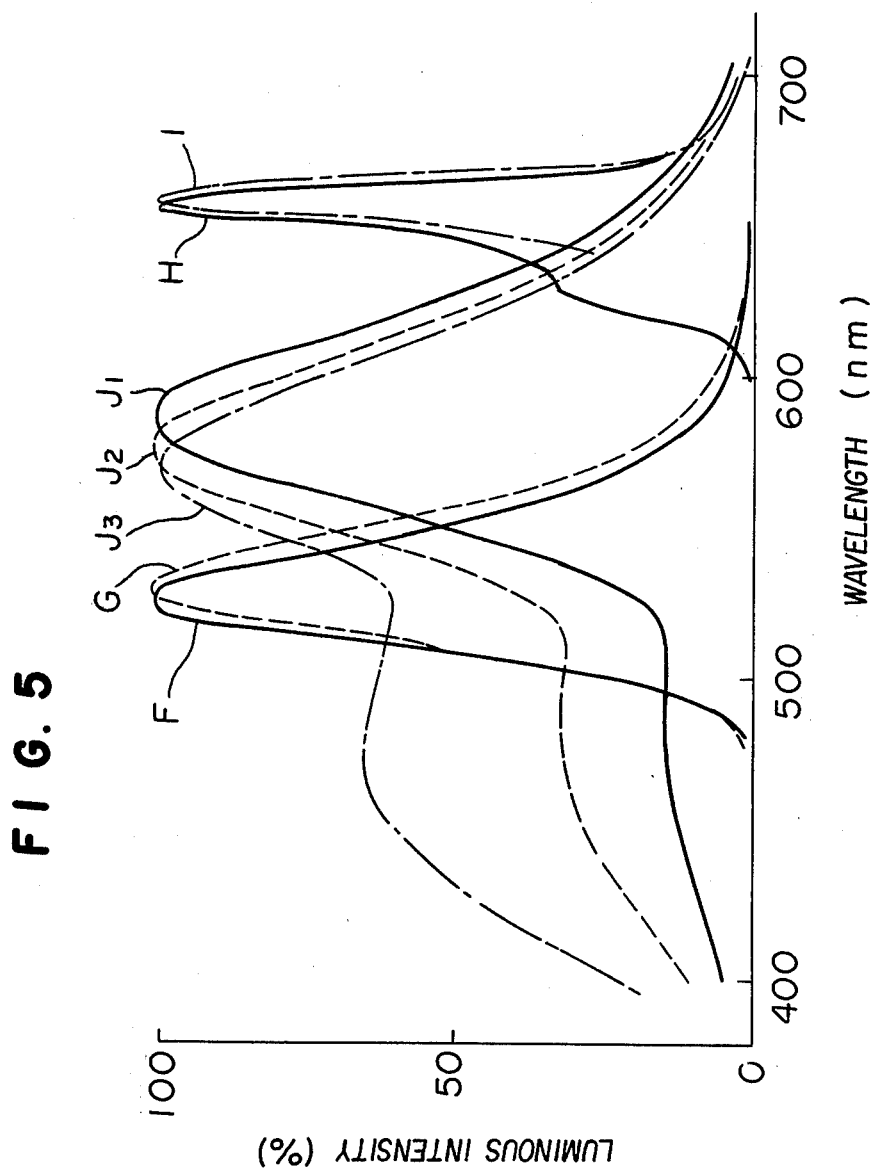
FIG. 5 shows the emission spectra of the fluorescent materials F, G, H, I, and $J_{1-3}$ shown in Table 1.

FIG. 5 shows emission spectra of the fluorescent materials F, G, H, I and $J_{1-3}$ shown in Table 1.

The luminous spectra of the fluorescent materials A, B, C and E are shown in FIGS. 2 and 3 and the emission spectra of the fluorescent materials D and K are respectively similar to those of C and J, but only the emission peak is shifted.

The present invention will be further illustrated by certain examples.

Each fluorescent material shown in Table 1 was mixed with a binder for coating and the mixture of the fluorescent material was coated on an inner surface of a glass tube and was baked to coat on the inner surface. Then, electrodes were connected at both ends of the glass tube and the glass tube was purged and sealed after introducing a small amount of mercury and rare gas and caps were connected to both ends to prepare a 40 W straight fluorescent lamp having a diameter of 32 mm. The amounts of the fluorescent materials coated on the inner surface were in a range of 3 to 7 g.

The kinds of the fluorescent materials (shown by the symbols shown in Table 1) and the ratios of the fluorescent materials are shown in Table 2.

As the reference, the characteristics of the conventional fluorescent lamps having good color rendering property are shown in Table 3. In these fluorescent lamps, the halophosphate fluorescent material was used as the fluorescent material which emits the energy of blue light.

As the results of comparison of the data in Tables 2 and 3, it is clear that the fluorescent lamps of the present invention had superior color rendering property and/or improved luminous efficiency in comparison with those of the conventional lamp having the same color temperature.

It is remarkable that the fluorescent lamps of Examples 6 to 10 having a color temperature of 5000° K. impart the same or higher Ra and significantly improved luminous efficiency of the same color temperature in comparison with the conventional lamp W-50-EDL having blue light absorbing layer in two layer coating system.

TABLE 1

| Symbol | Fluorescent material |
|---|---|
| A | strontium boron phosphate activated by a divalent europium compound |
| B | strontium-magnesium phosphate activated by tin |
| C | calcium halophosphate activated by antimony |
| D | strontium halophosphate activated by antimony |
| E | magnesium tungstanate |
| F | zinc silicate activated by manganese |
| G | zinc-magnesium silicate-germanate activated by manganese |
| H | magnesium-lithium arsenate activated by manganese |
| I | magnesium fluorogermanate activated by manganese |
| $J_1$ | calcium halophosphate activated by antimony and manganese (3000 K) |
| $J_2$ | calcium halophosphate activated by antimony and manganese (4200 K) |
| $J_3$ | calcium halophosphate activated by antimony and manganese (6100 K) |
| K | strontium halophosphate activated by antimony and manganese |

TABLE 1'

| Symbol | Chromaticity (FL 40S) x | y | Wavelength at emission peak (nm) | Band width (50%) (nm) |
|---|---|---|---|---|
| A | 0.188 | 0.307 | 480 | 87 |
| B | 0.477 | 0.389 | 630 | 135 |
| C | 0.200 | 0.277 | 470 | 145 |
| D | 0.250 | 0.344 | 500 | 150 |
| E | 0.228 | 0.306 | 480 | 140 |
| F | 0.238 | 0.610 | 525 | 42 |
| G | 0.261 | 0.615 | 530 | 48 |
| H | 0.571 | 0.285 | 655 | 20 |
| I | 0.536 | 0.278 | 660 | 20 |
| $J_1$ | 0.436 | 0.404 | 480,590 | —* |
| $J_2$ | 0.377 | 0.392 | 480,580 | — |
| $J_3$ | 0.319 | 0.353 | 470,575 | — |
| K | 0.362 | 0.422 | 500,570 | — | note:
*no measurement: (Two peaks are overlapped)

TABLE 2

| Example | A | B | C | D | E | F | G | H | I | $J_1$ | $J_2$ | $J_3$ | K |
|---|---|---|---|---|---|---|---|---|---|---|---|---|---|
| 1 | 20 | 80 | | | | | | | | | | | |
| 2 | 18 | 62 | | | | 5 | 7 | | 8 | | | | |
| 3 | 30 | 70 | | | | | | | | | | | |
| 4 | 42 | 58 | | | | | | | | | | | |
| 5 | 35 | 48 | | | | | 7 | | | | | | 10 |
| 6 | 51 | 49 | | | | | | | | | | | |
| 7 | 48 | 47 | | | | | | | | | 5 | | |
| 8 | 47 | 48 | | | | | | | | | | 5 | |
| 9 | 47 | 46 | | | | | | | 2 | | | 5 | |
| 10 | 46 | 48 | | | 1 | | | | | | | 5 | |
| 11 | 60 | 40 | | | | | | | | | | | |
| 12 | 36 | 37 | 27 | | | | | | | | | | |
| 13 | 42 | 37 | | 18 | | | | | | 3 | | | |
| 14 | 40 | 39 | | | 21 | | | | | | | | |

TABLE 2'

| Example | Chromaticity x | y | Color temp. (K) | Ra | Luminous efficiency (lm/W) |
|---|---|---|---|---|---|
| 1 | 0.422 | 0.375 | 3000 | 85 | 58.5 |
| 2 | 0.437 | 0.405 | 3000 | 90 | 59.7 |
| 3 | 0.395 | 0.365 | 3500 | 90 | 59.8 |
| 4 | 0.359 | 0.355 | 4500 | 96 | 61.5 |
| 5 | 0.361 | 0.364 | 4500 | 97 | 60.6 |
| 6 | 0.344 | 0.349 | 5000 | 97 | 62.0 |
| 7 | 0.345 | 0.349 | 5000 | 97 | 63.1 |
| 8 | 0.345 | 0.350 | 5000 | 97 | 62.3 |
| 9 | 0.345 | 0.348 | 5000 | 98 | 62.0 |
| 10 | 0.346 | 0.353 | 5000 | 98 | 63.0 |
| 11 | 0.312 | 0.342 | 6500 | 96 | 63.3 |
| 12 | 0.314 | 0.327 | 6500 | 98 | 58.8 |
| 13 | 0.311 | 0.345 | 6500 | 97 | 61.2 |
| 14 | 0.313 | 0.332 | 6500 | 98 | 61.2 |

TABLE 3

| Blue light absorbing layer | Type | Color temp (K) | Ra | Luminous efficiency (lm/W) |
|---|---|---|---|---|
| none | WW-30-DL | 3000 | 70 | 59 |
| | WW-DL | 3300 | 72 | 59 |
| | W-DL | 4500 | 84 | 60 |
| | W-SDL | 4900 | 92 | 55 |
| | D-SDL | 6500 | 94 | 55 |
| used | W-50-EDL | 5000 | 97 | 52 |

As the results of the tests, it was found that the fluorescent lamp of the present invention had improved luminous flux maintenance factor.

For example, after operating for 1000 hours, all of the fluorescent lamps of the examples had the luminous flux in a range of 91 to 94% of the luminous flux at zero time, whereas those of the conventional fluorescent layer shown in Table 3 were in a range of 86 to 89%.

Figure 6:
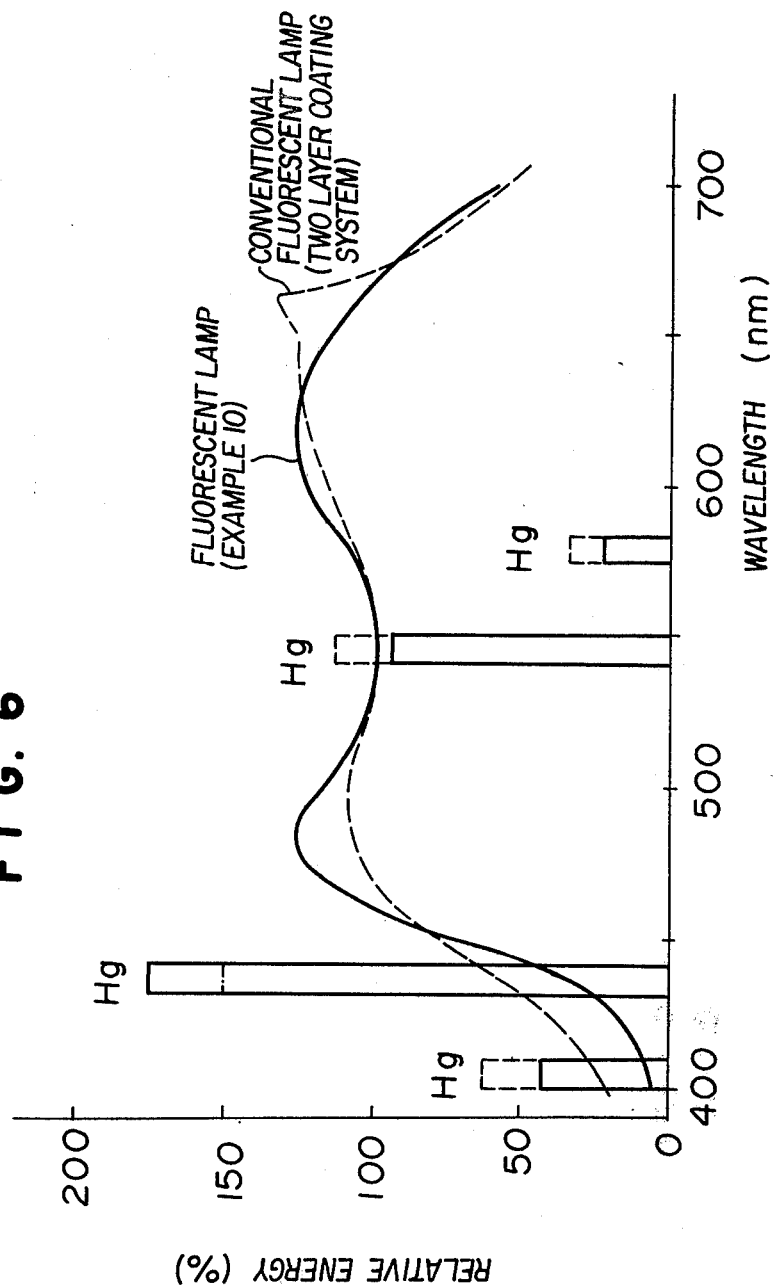
FIG. 6 shows the spectral distribution of the fluorescent lamp of Example 10.
Figure 7:
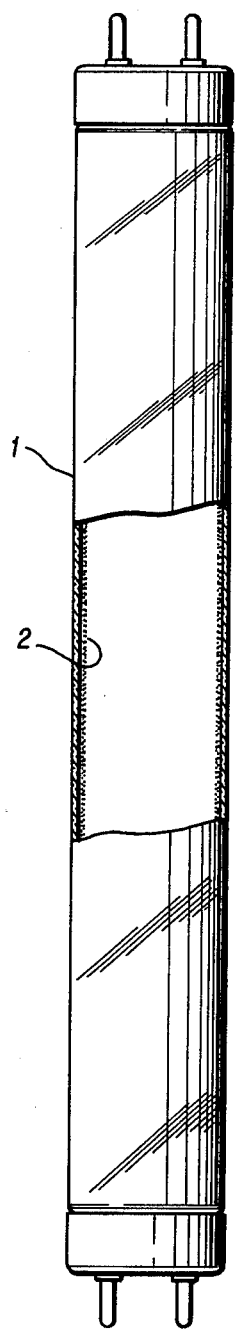
FIG. 7, illustrates the fluorescent lamp of this invention.

FIG. 6 shows the spectral distribution of the fluorescent lamp of Example 10 having excellent results of both color rendering property and luminous efficiency (the full line) and also the spectral distribution of the conventional lamp W-50-EDL having blue light absorbing layer in two layer coating system which had the best color rendering property of the reference lamps (the broken line).

It has been found that the energy of blue light is substantially controlled in the fluorescent lamp of the invention even though the blue light absorbing layer is not provided.

In FIG. 6, the reference Hg designates mercury bright line spectrum.

The high color rendering property is required in places processing printing and making a printing plate.

At such places, as found in the standard for lightening in color evaluation proposed by Japan Technical Association of Graphic Arts (Standard lightening for color evaluation in manufacture of printing plate and processing of printing. December 1965). The following fluorescent lamp is required.

(1) color temperature of 5000 K ± 200 K
(2) more than 95 of Ra
(3) less than 15% of total of mercury bright line spectrum to total energy in visible region measured by 31 equal wavelength dividing method.

The fluorescent lamps of Examples 6 to 10 are satisfactory for such high standard conditions.

The detailed spectral distribution of the fluorescent lamp of Example 10 shown in FIG. 5 is shown in Table 4 by the 31 equal wavelength dividing method.

It is clearly found that the fluorescent lamp is satisfactory for the third condition (10.6%) from Table 4 and also that it is satisfactory for the first and second conditions from Table 2.

It should be considered that a fluorescent lamp for satisfying such severe conditions could be obtained only by forming a blue light absorbing layer in the two layer coating system.

TABLE 4

| Wavelength (nm) | Relative energy (%) | Wavelength (nm) | Relative energy (%) |
|---|---|---|---|
| 400 | 6.3 | 600 | 121.9 |
| 410 | 8.5 | 610 | 126.4 |
| 420 | 11.7 | 620 | 127.5 |
| 430 | 21.6 | 630 | 125.7 |
| 440 | 44.9 | 640 | 121.3 |
| 450 | 74.1 | 650 | 114.6 |
| 460 | 103.5 | 660 | 105.9 |
| 470 | 119.9 | 670 | 95.2 |
| 480 | 126.7 | 680 | 81.9 |
| 490 | 123.4 | 690 | 72.5 |
| 500 | 116.4 | 700 | 60.6 |
| 510 | 109.5 | Mercury bright line spectrum | |
| 520 | 105.3 | | |
| 530 | 101.5 | 405 | 43.3 |
| 540 | 98.1 | 436 | 177.4 |
| 550 | 98.1 | 546 | 94.0 |
| 560 | 100.0 | 578 | 23.4 |
| 570 | 104.7 | | |
| 580 | 111.2 | | |
| 590 | 117.9 | | |

As the results of tests, it was found that the following ratios by weight of the fluorescent materials are desired.

5 to 75% of alkaline earth metal boron phosphate activated by a divalent europium compound;

10 to 85% of alkaline earth metal phosphate containing magnesium and/or zinc activated by tin;

0 to 50% of one or more of alkaline earth metal halophosphate activated with antimony and magnesium tungstate;

0 to 10% of one or more of zinc silicate activated by manganese and zinc-magnesium silicate-germanate activated by manganese;

0 to 35% of one or more of magnesium-lithium arsenate activated with manganese and magnesium fluorogermanate activated by manganese;

0 to 50% of alkaline earth metal halophosphate activated by antimony-manganese.

High color rendering property can be obtained and light color natural to the eye can be obtained by said combinations.

The maximum ratio of the zinc silicate and the zinc-magnesium silicate-germanate should be 10%. When it is higher than 10%, the luminous flux maintenance characteristics of the fluorescent material is relatively inferior whereby the light color is easily changed during operation.

The ratios of the fluorescent materials can be also applied for the other fluorescent materials whose luminous efficiency and emission spectrum are similar to those of said fluorescent materials and whose emission spectrum is in the defined range.

It is also possible to adjust them by increasing the ratio of the fluorescent material having lower luminous efficiency and decreasing the ratio of the fluorescent material having higher luminous efficiency when the emission spectrum is the same.

It was confirmed that in comparison with the conventional fluorescent lamps, the improved color rendering property and higher luminous efficiency can be attained even though a part of the strontium of strontium boron phosphate activated by a divalent europium compound is substituted with barium or calcium in the crystals.

The strontium-magnesium phosphate activated by tin can incorporate small amount of barium or calcium in the crystals or incorporate zinc instead of a part or whole of magnesium. It is important to use the fluorescent material having luminous peak in a range of wavelength of 620 to 640 nm and the band width (50%) of 120 to 160 nm and the emission spectrum being similar to that of FIG. 3.

In the other fluorescent materials used in the present invention, it was confirmed that it is possible to obtain satisfactory results even though a different fluorescent material having slightly different emission spectrum is used when said emission spectrum is in said range.

It was also confirmed that similar results can be obtained even though three blue emitting fluorescent materials (C,D,E) are combined with each other; two green emitting fluorescent materials (F,G) are combined with each other; two red emitting fluorescent materials (H,I) are combined with each other; or four halophosphate fluorescent materials ($J_1,J_2,J_3,K$) are combined with each other.

The first to fifth fluorescent materials are defined by the wavelength range at the emission peak and the band width (50%) or the luminous wavelength region as the result of many tests using the various fluorescent materials having different formulae and the combinations of the fluorescent materials such as the three blue emitting fluorescent material as a group; the two green emitting fluorescent materials as a group; the two red emitting fluorescent materials as a group; the four halophosphate fluorescent materials as a group to give various emission spectra, thereby confirming the fact that the results of the present invention can be obtained by using the fluorescent materials having the emission spectra defined above.

As is clear from the above-mentioned description, it is also possible to use as the fluorescent materials of the present invention in same manner, the other fluorescent materials having the same or similar emission spectra whose element in the crystals is partially substituted with another element, such as cadmium containing alkaline earth metal halophosphate activated by antimony or antimony-manganese; boron containing magnesium-lithium arsenate activated by manganese.

What is claimed is:

1. A fluorescent lamp which comprises a luminous layer comprising mainly a first fluorescent material having the emission peak in a range of wavelength of 480 to 490 nm and a second fluorescent material having the emission peak in a range of wavelength of 620 to 640 nm and a band width (50%) of 120 to 160 nm, on an inner surface of a discharge tube wherein the first fluorescent material is an alkaline earth metal boron phosphate activated by a divalent europium compound having the formula $$m(Sr_{1-x-y-p}Ba_xCa_yEu_pO)\cdot(1-n)P_2O_5\cdot nB_2O_3,$$

wherein the parameters x, y, p, m, and n are respectively in ranges of $0 \leq x \leq 0.5$
$0 \leq y \leq 0.2$
$0.001 \leq p \leq 0.15$
$1.75 \leq m \leq 2.30$ and
$0.05 \leq n \leq 0.23$.

2. A fluorescent lamp according to claim 1 wherein the second fluorescent material is a strontium-magnesium phosphate activated by tin or a modified one wherein a part of the strontium is substituted with barium or calcium or the a part or whole of the magnesium is substituted with zinc.

3. A fluorescent lamp according to claim 1 wherein the first fluorescent material having the emission peak in a range of wavelength of 480 to 490 nm and the formula defined and the second fluorescent material having the emission peak in a range of wavelength of 620 to 640 nm and a band width (50%) of 120 to 160 nm are combined with one or more of a third to sixth fluorescent materials defined below to form a luminous layer on an inner surface of the discharge tube;

(a) the third fluorescent material having the emission peak in a range of wavelength of 470 to 500 nm and a band width of 140 to 150 nm;

(b) the fourth fluorescent material having the emission peak in a range of wavelength of 520 to 540 nm and a band width of 40 to 50 nm;

(c) the fifth fluorescent material having the emission peak in a range of wavelength of 655 to 660 nm which mainly emits in a range of wavelength of 600 to 700 nm; and (d) the sixth fluorescent material having two emission peaks in ranges of 470 to 500 nm and 570 to 590 nm which mainly emits in a range of visible wavelength of 400 to 700 nm.

4. A fluorescent lamp according to claim 3 wherein the second fluorescent material is a strontium-magnesium phosphate activated by tin or a modified one wherein a part of the strontium is substituted with barium or the calcium or a part or whole of the magnesium is substituted with zinc.

5. A fluorescent lamp according to claim 3 wherein the third fluorescent material is an alkaline earth metal halophosphate activated by antimony or a magnesium tungstate.

6. A fluorescent lamp according to claim 3 wherein the fourth fluorescent material is zinc silicate activated by manganese or zinc-magnesium silicate-germanate activated by manganese.

7. A fluorescent lamp according to claim 3 wherein the fifth fluorescent material is magnesium fluorogermanate activated by manganese or magnesium-lithium aresenate activated by manganese.

8. A flourescent lamp according to claim 3 wherein the sixth fluorescent material is an alkaline earth metal halophosphate activated by antimony-manganese.

* * * * *